US012634145B2

(12) United States Patent

Gray et al.

(10) Patent No.: US 12,634,145 B2

(45) Date of Patent: May 19, 2026

(54) CRYPTOGRAPHIC TRUST SYSTEM FOR ELECTRONIC COMMUNICATIONS INTEGRITY USING TUPLE SPACES AND MESSAGING USER AGENTS

(71) Applicant: Mitel Networks Corporation, Kanata (CA)

(72) Inventors: Thomas Gray, Mansfield (CA); Logendra Naidoo, Ottawa (CA)

(73) Assignee: Mitel Networks Corporation, Kanata (CA)

( * ) Notice: Subject to any disclaimer, the term of this patent is extended or adjusted under 35 U.S.C. 154(b) by 199 days.

(21) Appl. No.: 18/402,526

(22) Filed: Jan. 2, 2024

(65) Prior Publication Data

US 2025/0219842 A1 Jul. 3, 2025

(51) Int. Cl.
*H04L 9/32* (2006.01)

(52) U.S. Cl.
CPC .......... *H04L 9/3242* (2013.01); *H04L 9/3247* (2013.01)

(58) Field of Classification Search
CPC .... H04L 51/212; H04L 51/48; H04L 63/0442
See application file for complete search history.

(56) References Cited

U.S. PATENT DOCUMENTS

| | | | |
|---|---|---|---|
| 8,571,993 | B2 | 10/2013 | Kocher et al. |
| 8,578,169 | B2 | 11/2013 | Adams et al. |
| 10,044,662 | B1 | 8/2018 | Mesters et al. |
| 10,305,833 | B1 | 5/2019 | Dennis |

| | | | | |
|---|---|---|---|---|
| 10,505,736 | B1 * | 12/2019 | Meixler | ................ H04L 9/3236 |
| 10,574,453 | B2 | 2/2020 | Notani | |
| 10,911,386 | B1 * | 2/2021 | Beckman | .............. H04L 51/216 |
| 10,986,169 | B2 * | 4/2021 | Ziebell | ................ G06F 21/6263 |
| 11,895,151 | B1 * | 2/2024 | Castro | ................... H04L 51/212 |
| 2005/0198511 | A1 * | 9/2005 | Tomkow | .............. H04L 63/123 |
| | | | | 713/176 |

(Continued)

FOREIGN PATENT DOCUMENTS

| | | |
|---|---|---|
| WO | 2017027648 A1 | 2/2017 |
| WO | 2020176975 A1 | 9/2020 |

OTHER PUBLICATIONS

De, Nikhilesh, "Salesforce Wins Patent Trackling Email Spam With Blockchain", Website https://www.coindesk.com; Business; Nov. 7, 2018.

*Primary Examiner* — Olugbenga O Idowu

(57) ABSTRACT

An electronic communication system for certification of an electronic communication includes: (1) a cryptographic trust server (CTS); (2) a common memory to store electronic communications; (3) a tuple server configured to generate tuple spaces; (4) a first user device; and (5) a first messaging user agent (MUA) associated with the first user device. The first MUA is configured to generate an MUA cryptographic hash for a first electronic communication, and the MUA places the first electronic communication with the cryptographic hash in the common memory, optionally with an iterative communication thread of prior electronic communications. The first MUA places an alert and the location of the first electronic communication in a tuple space provided by the tuple server. The alert notifies the CTS to access the common memory to review and verify or not verify the MUA cryptographic hash and optionally verify or not verify a CTS hash of the iterative communication thread.

20 Claims, 4 Drawing Sheets

(56)          References Cited

U.S. PATENT DOCUMENTS

| | | | |
|---|---|---|---|
| 2006/0200523 A1* | 9/2006 | Tokuda | H04L 51/48 |
| | | | 709/206 |
| 2012/0066498 A1* | 3/2012 | Engert | G06F 21/51 |
| | | | 713/170 |
| 2016/0366091 A1* | 12/2016 | Baldwin | H04L 51/216 |
| 2016/0380942 A1* | 12/2016 | Salpe | H04L 51/216 |
| | | | 707/747 |
| 2017/0134323 A1 | 5/2017 | Alexander et al. | |
| 2018/0152461 A1* | 5/2018 | Albisu | H04L 63/14 |
| 2018/0219810 A1* | 8/2018 | Santos Ramirez | G06Q 10/107 |
| 2019/0312831 A1* | 10/2019 | Gupta | H04L 51/216 |
| 2019/0349426 A1 | 11/2019 | Smith et al. | |
| 2021/0029170 A1* | 1/2021 | Gupta | G06F 21/554 |
| 2021/0149720 A1* | 5/2021 | Mehta | G06F 9/4881 |
| 2022/0100498 A1* | 3/2022 | Guim Bernat | G06F 8/71 |
| 2022/0198049 A1* | 6/2022 | Dumas | H04L 9/0825 |
| 2024/0320338 A1* | 9/2024 | Chhetri | G06N 3/0464 |
| 2024/0422141 A1* | 12/2024 | Shade | H04L 63/0442 |

* cited by examiner

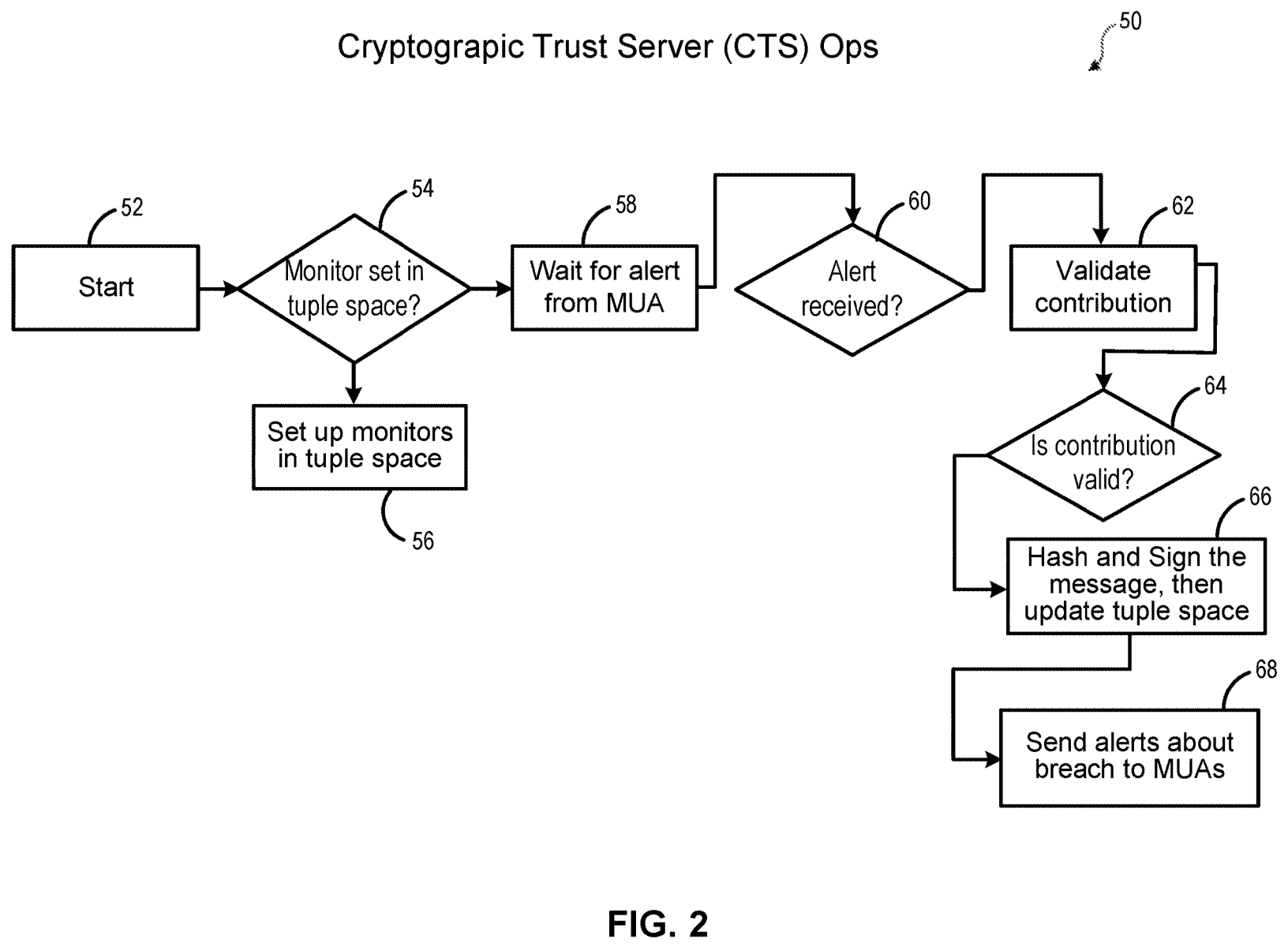

Cryptograpic Trust Server (CTS) Ops

50

52 Start

54 Monitor set in tuple space?

56 Set up monitors in tuple space

58 Wait for alert from MUA

60 Alert received?

62 Validate contribution

64 Is contribution valid?

66 Hash and Sign the message, then update tuple space

68 Send alerts about breach to MUAs

FIG. 2

Contribution Rcvd Through MUA

CRYPTOGRAPHIC TRUST SYSTEM FOR ELECTRONIC COMMUNICATIONS INTEGRITY USING TUPLE SPACES AND MESSAGING USER AGENTS

FIELD

This disclosure relates to verifying the authenticity of an electronic communication, or electronic communication thread, by utilizing a tuple space, a cryptographic trust server (CTS), and one or more messaging user agents (MUAs). The contents of U.S. Pat. No. 7,522,710 that are not inconsistent with the disclosure of this Application are incorporated herein by reference.

BACKGROUND

The systems and methods of this disclosure permit a group of two or more non-trusting entities to collaborate via electronic communications that the entities can trust to accurately reflect their interaction or negotiation. No entity can easily delete, add to, or modify the electronic communication thread without other entities being alerted to the tampering. This assured trust can enable a more efficient and clear interaction or negotiation to achieve a better outcome.

In addition to the difficulty of following electronic communication, such as email, threads and the necessity for trust of each communication, there is also a need to ensure that no tampering occurs within each electronic communication. Therefore, a system that can authenticate the origin of each message or annotation and/or validate integrity is desirable.

Blockchains are suited to digital ledgers that hold chains of transactions. For example, in Bitcoin, the chain of transactions can be followed backwards to the original transaction creating the element of bitcoin when it was mined. This assures the validity of the Bitcoin. U.S. patent application Ser. No. 17/093,238, the contents of which that are not inconsistent with this disclosure is incorporated herein by reference and discloses a hash of an email thread that is stored in a blockchain. Blockchain is not best suited for this type of non-transactional data authentication because the entire blockchain of information must be considered and stored.

Cryptographic technologies also exist. They require manual validation steps or complex third-party software that do not readily integrate into email or similar electronic communication systems. Such approaches do not easily facilitate multi-threaded, multi-party electronic communications, such as email threads, with in-built trust for each electronic communication.

Tuple spaces are better suited for this type of authentication because they eliminate the need to save the chains of transactions associated with blockchains. A cryptographic hash applied by an MUA can be used to verify the authenticity of a new electronic communication, and only a current cryptographic hash associated with the new (or first) single electronic communication in the thread need be checked to verify the authenticity of the new electronic communication. Additionally, the electronic communication thread prior to the new electronic communication in the thread can be validated by checking a hash previously applied to the thread by the CTS.

BRIEF DESCRIPTION OF THE DRAWINGS

The subject matter of the present disclosure is particularly pointed out and distinctly claimed in this specification. A more complete understanding of the present disclosure, however, may be obtained by referring to the detailed description and claims when considered in connection with the drawing figures, wherein:

FIG. 2 shows a computer method in accordance with aspects of this disclosure.

Figure 1:
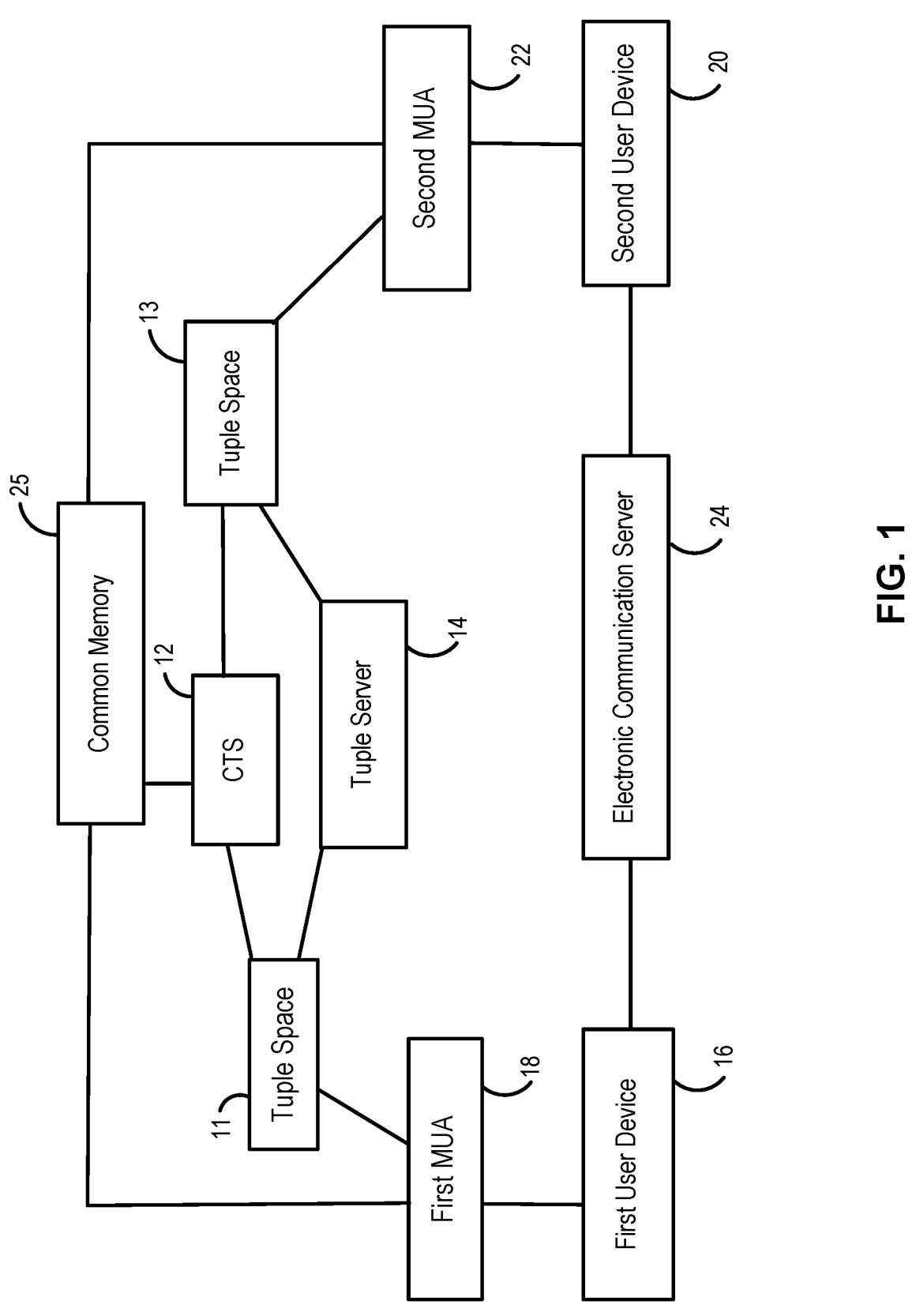
FIG. 1 shows a computer system in accordance with aspects of this disclosure.

It will be appreciated that structures, devices, and method steps in the figures are illustrated for simplicity and clarity and have not necessarily been drawn to scale. For example, the dimensions of some of the structures in the figures may be exaggerated relative to other structures to help to improve understanding of illustrated embodiments of the present disclosure.

DETAILED DESCRIPTION

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

The systems and methods of this disclosure are non-blockchain approaches for ensuring the integrity and security of electronic communication threads, by using cryptographic hashing, tuple spaces, one or more messaging user agents (MUAs) in communication with one or more user devices, and a cryptographic trust server (CTS). The CTS and MUA(s) work to authenticate and certify a new contribution, or all contributions, to an electronic communication thread. The CTS acts as the supervising entity that validates an MUA cryptographic hash applied by an MUA to a new contribution (sometimes referred to herein as a first electronic communication) to an electronic communication thread, and the MUA digitally signs each new contribution to the electronic communication thread when it is verified by the CTS.

Blockchains store information across a decentralized network of nodes. The present systems and methods, however, utilize the CTS, which acts as a centralized device for authentication and validation of electronic communications. This is easier to integrate with existing electronic communication, such as email, systems. The system and method of this disclosure may focus only on the authentication of a new, individual electronic communication, but can also verify the integrity of an entire electronic communication thread.

In one example, the MUA cryptographic hash of a new electronic communication is placed along with the new electronic communication into a common memory. The MUA places in a tuple space an alert and the location in the common memory of the new electronic communication. The alert notifies the CTS to access the cryptographic hash in the common memory and verify it, or not verify it, using a known private key, or a known private key and public key, of the MUA or of a user device associated with the new electronic communication.

In another example, when the new electronic communication is created, either as a first electronic communication in an electronic communication thread (also called a string) or as an additional electronic communication added to an electronic communication thread, the new (also referred to herein as a first) electronic communication and any other electronic communications in the thread are placed by an MUA, a user device, a server, or any suitable device, into the common memory that is accessible by the CTS. A tuple server generates a tuple (also called a tuple space) that is in communication with the CTS and with the MUA that is in communication with a user device that created the new electronic communication. The MUA generates an MUA cryptographic hash for the new electronic communication using the MUA's private key, or private key and public key, and places either just the new electronic communication, or the entire electronic communication thread including the new electronic communication, into the common memory with the MUA cryptographic hash on the new electronic communication.

The MUA places an alert in the tuple space, wherein the alert notifies the CTS that the new electronic communication has been added to the common memory. The MUA also places in the tuple space the location of the new electronic communication in the common memory. In response to the alert, the CTS accesses the common memory and reviews the MUA cryptographic hash of the new electronic communication against a known private key, or private key and public key, of the MUA or of a user device from which the new electronic communication originated. The CTS optionally reviews a CTS hash it previously applied to the prior electronic communications in the electronic communication thread (if present) in the common memory and verifies (1) the new electronic communication by comparing the MUA cryptographic hash to the private key, or private key and public key, and optionally (2) the electronic communications in the thread previous to the new electronic communication by checking the CTS's hash previously applied to the thread against a known value for the CTS hash. If the new electronic communication's MUA hash, and optionally the previous CTS hash, are valid, the CTS verifies (also referred to as validates, certifies, or authenticates) the entire electronic communication thread including the new electronic communication and applies an overall CTS hash to the entire electronic communication string including the new electronic communication. Alternatively, the CTS need only verify the MUA cryptographic hash on the new electronic communication.

The tuple space(s) allows for either direct or indirect communication between the CTS and the MUA(s). The tuple space(s) are used to receive and hold (1) an alert to the CTS from an MUA, and (2) the location in the common memory of (a) a new contribution to an iterative electronic communication thread, or (b) the location each contribution in an iterative electronic communication thread, such as each individual email, text message, or chat message, including the new contribution. For example, if an email is sent and/or received, the MUA associated with the user device that sends or receives the email may directly or indirectly interact with the CTS so the CTS can verify an MUA cryptographic hash against a stored value for a private key, or a private key and public key. Alerts and monitors can be generated by the CTS and placed in a tuple space to notify (1) MUA(s) that the new electronic communication or the entire electronic communication thread is verified, and (2) MUA(s), other system applications, and/or a systems administrator of any unauthorized changes to the electronic communication thread, an unauthorized new contribution, or other breaches in security.

An MUA is typically assigned to and in communication with each user device and a separate user device is preferably assigned to each user, although an MUA may service multiple user devices. The MUA can function as a plug in to a user's email or other electronic communication device. Each MUA preferably contains a private and public key pair that may be used as a cryptographic identifier for a human user. An MUA cryptographically hashes, using a private key, or private key and public key, a new electronic communication by a user to verify that the user created the contribution. An MUA acts in two ways—one in sending an electronic communication and the other in receiving an electronic communication. It interacts with the CTS via a tuple space to obtain verification that a user's current contribution to an iterative electronic communication thread (also referred to herein as an electronic communication thread, or string), and optionally the other communications in the electronic communication thread, are legitimate and have not been illicitly modified. The MUA can, in some implementations, receive permission from the CTS to send an electronic communication after verification. The MUA can also receive a notification from the CTS that a specific electronic communication has been sent and can confirm on reception that the received electronic communication is valid.

As used herein, the terms application, module, analyzer, and the like can refer to computer program instructions, encoded on computer storage medium for execution by, or to control the operation of, data processing apparatus. A system and method of this disclosure can operate on a local network or in a cloud-based environment.

Alternatively, or additionally, the program instructions can be encoded on an artificially generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially generated propagated signal. The computer storage medium is non-transitory and can also be, or be included in, one or more separate physical components or media (e.g., solid-state memory that forms part of a device, disks, or other storage devices).

As used herein, "engine," "processor," "server," and "MUA," refers to a data-processing apparatus configured to execute computer program instructions, encoded on computer storage medium, wherein the instructions control the operation of the engine. Alternatively, or additionally, the program instructions can be encoded on an artificially generated propagated signal, e.g., a machine-generated electrical, optical, or electromagnetic signal, which is generated to encode information for transmission to suitable receiver apparatus for execution by a data processing apparatus.

As used herein, "database" or "memory" refers to any suitable database for storing information, electronic files or code to be utilized to practice embodiments of this disclosure.

Turning now to the figures, wherein the purpose is to describe embodiments of this disclosure and not to limit the scope of the claims, FIG. 1 shows a computer system 10 that comprises a cryptographic trust server (CTS) 12 and a tuple server 14, which is configured to generate one or more tuple spaces, such as tuple space 11 or 13. CTS 12 includes or communicates with at least (1) the common memory 25 configured to temporarily (preferred) or permanently store one or multiple iterations of an electronic communication thread, (2) a tuple space generated by tuple server 14 to hold alerts and pointers to a new contribution location in the common memory to an electronic communication thread, or to the locations of each electronic communication in an electronic communication thread, and (3) a processor to perform the operations described herein.

The tuple server 14 may be part of CTS 12, or be a separate device, or be part of any suitable device of system 10. A first user device 16 is any suitable electronic device, such as a computer or cell phone, capable of sending and receiving electronic communications. First user device 16 is in communication with a first multiple messaging user agent (MUA) 18 and with an electronic communication server 24, which is configured to transmit electronic communications (also referred to herein as messages) between user devices.

A second user device 20 is any suitable electronic device, such as a computer or cell phone, capable of sending and receiving electronic communications. Second user device 20 is in communication with a second MUA 22 and with electronic communication server 24. Any number of user devices and MUAs may be utilized in a system or method of this disclosure. Each user creates an account on system 10, such as with CTS 12, by generating a private key, or a public/private key pair. If a public key is generated it is associated with an address, such as an email address, used with the user's user device. The public key is stored and is accessible by CTS 12. The private key is accessible by or stored in CTS 12 and is kept secure by the user such as by storing it in an operating system (OS) secure store accessible with or on the user's user device using a key derivation function (KDF) or similar technology.

A common memory 25 is in communication with, or is part of, CTS 12, and is in communication with MUAs 18 and 22, and/or first user device 16 and second user device 18, and CTS 12.

Tuple spaces 11, 13, when generated by tuple server 14, are resident on either first MUA 18 and/or second MUA 22, CTS 12, tuple server 14, or on any suitable device of system 10 so that at least one MUA 18 or 22 and CTS 12 can communicate with at least one tuple space 11 or 13.

Each tuple space 11, 13 is configured to receive one or more of (1) an alert from an MUA 18 or 22 to notify the CTS 12 that a new contribution to an iterative electronic communication thread has been placed in common memory 25, and (2) the location of the new contribution in the common memory 25. In another embodiment, the tuple space may receive an MUA cryptographic hash generated by an MUA using the private key or its private key and public key, and/or possibly an electronic (or digital) signature placed on a new electronic communication by an MUA 18 or 22.

In operation, a user uses either first user device 16 or second user device 18 to generate a new contribution (also referred to herein as a first contribution or a first electronic communication) to an iterative electronic communication thread. The new contribution may be the first electronic communication in the electronic communication thread. The first MUA 18 or second MUA 22 places an MUA cryptographic hash on the new contribution utilizing the private key or the private key and public key. Either the MUA 18 or 22, or the first user device 16 or second user device 20, place the new electronic communication with the MUA cryptographic hash into the common memory 25. MUA 18 or 22 then places into tuple space 11 or 13 (1) an alert for CTS 12 and the location of the new electronic communication in the common memory 25, or (2) an alert for CTS 12 and the location of each electronic communication in the iterative communication thread, including the new electronic communication, in the common memory 25.

CTS 12, in response to the alert placed in the tuple space 11 or 13, accesses the new electronic communication in common memory 25 and verifies the MUA cryptographic hash of the MUA by comparing it to the known MUA private key or private key and public key values. The CTS 12 can also verify the authenticity of prior electronic communications in the iterative electronic communication thread by verifying the CTS hash it previously placed on the thread, wherein the previous CTS hash value can be stored by the CTS 12, in the common memory 25, or at any suitable location in system 10. If the authenticity of the MUA cryptographic hash on the new electronic communication, and optionally the CTS hash on the entire thread of prior electronic communications in the iterative thread, is verified CTS 12 places a new CTS hash over the entire iterative electronic communication thread, including the new communication added to the thread, to verify that the thread is authentic. This permits an MUA 18, 22 or first user device 16 or second user device 18 to send and/or receive the verified iterative electronic communication thread. Preferably, CTS 12 places an alert in tuple space 11 or 13 to notify MUA 18 or 22 that the new communication or the entire iterative electronic communication thread, including the new communication, is valid which communicates to MUA 18 or 22 to send or receive the iterative electronic communication thread.

If the authenticity is not verified CTS 12 does not place its own hash over the entire iterative electronic communication thread including the new electronic communication to verify that the thread is authentic, and does not permit an MUA 18, 22 or first user device 16 or second user device 18 to transmit and/or receive the thread.

CTS 12 or an MUA 18, 22 may also send an alert, as explained further below, if the new electronic communication or the electronic communication thread is not verified. Once CTS 12 has verified or not verified the new electronic communication or the iterative electronic communication thread including the new electronic communication, the electronic communications in common memory 25 may be deleted or removed. Thus, the entire iterative electronic communication thread, and versions of the thread, need not be stored. Further, the tuple spaces 11, 13 need not store any information after the verification or non-verification of a new electronic communication, or of an iterative electronic communication thread including a new electronic communication, is complete and any alerts are posted.

FIG. 2 shows an exemplary computer method 50 of this disclosure. Method 50 starts at step 52 by a user adding a new contribution to an electronic communication, such as an email, thread. At step 54, the MUA 18 or 22 hashes and digitally signs the new contribution utilizing its private key. A tuple space is generated by tuple server 14, and the tuple space 11 or 13 is in communication with an MUA, such as MUA 18 or 22. At step 58, the MUA 18 or 22 places the new contribution and the electronic communication thread of which the new contribution is a part, in the common memory 25 and places an alert in the tuple space 11 or 13 notifying CTS 12. The MUA may also place one or more of the (1) MUA's cryptographic hash identifier, (2) location of the new contribution in the common memory 25, and (3) location of each individual electronic communication in the iterative electronic communication thread into the tuple space 11 or 13 to be accessed by CTS 12.

At step 60, the alert is received by the CTS 12 and at step 62, CTS 12 determines if the new electronic communication to be added to the iterative electronic communication thread is valid by reviewing its MUA cryptographic hash against the MUA private key or MUA private key and public key, which are stored and accessible by the CTS 12 in any suitable manner. CTS 12 can also verify the prior electronic communications in the iterative electronic communication thread to ensure that the thread has not been altered by verifying whether the CTS hash it previously placed on the thread of prior electronic communications is still there, or if it has been removed or replaced with a different hash. CTS 12 can verify the CTS hash by comparing it to a known, stored value for the CTS hash. If the CTS hash has been removed or replaced with a different hash, or is otherwise tampered with, the CTS 12 does not verify the iterative electronic communication thread.

If the iterative electronic communication thread including the new contribution is valid, at step 66 the iterative electronic communication thread including the new contribution is hashed by the CTS and the new contribution is digitally signed by the MUA 18 or 22. The tuple space 11 or 13 is updated with a verification transmitted by the CTS 12 to the MUA 18 or 22 that permits the MUA 18 or 22 to send or receive the updated iterative electronic communication thread. In some implementations the MUA 18 or 22 will then send the electronic communication to one or more user devise or be permitted to receive it. The MUA 18 or 22 may further await permission from the CTS to send and/or receive the new contribution or the iterative electronic communication thread including the new contribution.

At step 68, if the new contribution (i.e., the new electronic communication) is not validated by CTS 12, an alert of a security breach is sent via tuple space 11 or 13 to the MUA 18 or 22, and the new electronic communication will not be added to the electronic communication thread or be transferred to another user device. An alert may also be sent by the CTS 12 or an MUA 18 or 22, directly or indirectly through a tuple space 11 or 13, to a system administrator, wherein the alert could include the identity of the user device from which the non-validated electronic communication originated, the content of the non-validated electronic communication, and the date and time the non-validated electronic communication was generated. Such an alert may also be generated by CTS 12 if it detects tampering with any electronic communication in the iterative electronic communication thread. As previously described, CTS 12 can make the determination by comparing the hash on the entire iterative electronic communication thread to the known value of the hash CTS previously placed on the thread (which is referred to a CTS hash) hash is missing or is not the hash previously applied by CTS 12. If the CTS hash is missing, replaced, or has been altered, an alert of a security breach can be placed by CTS 12 in a tuple space.

Figure 3:
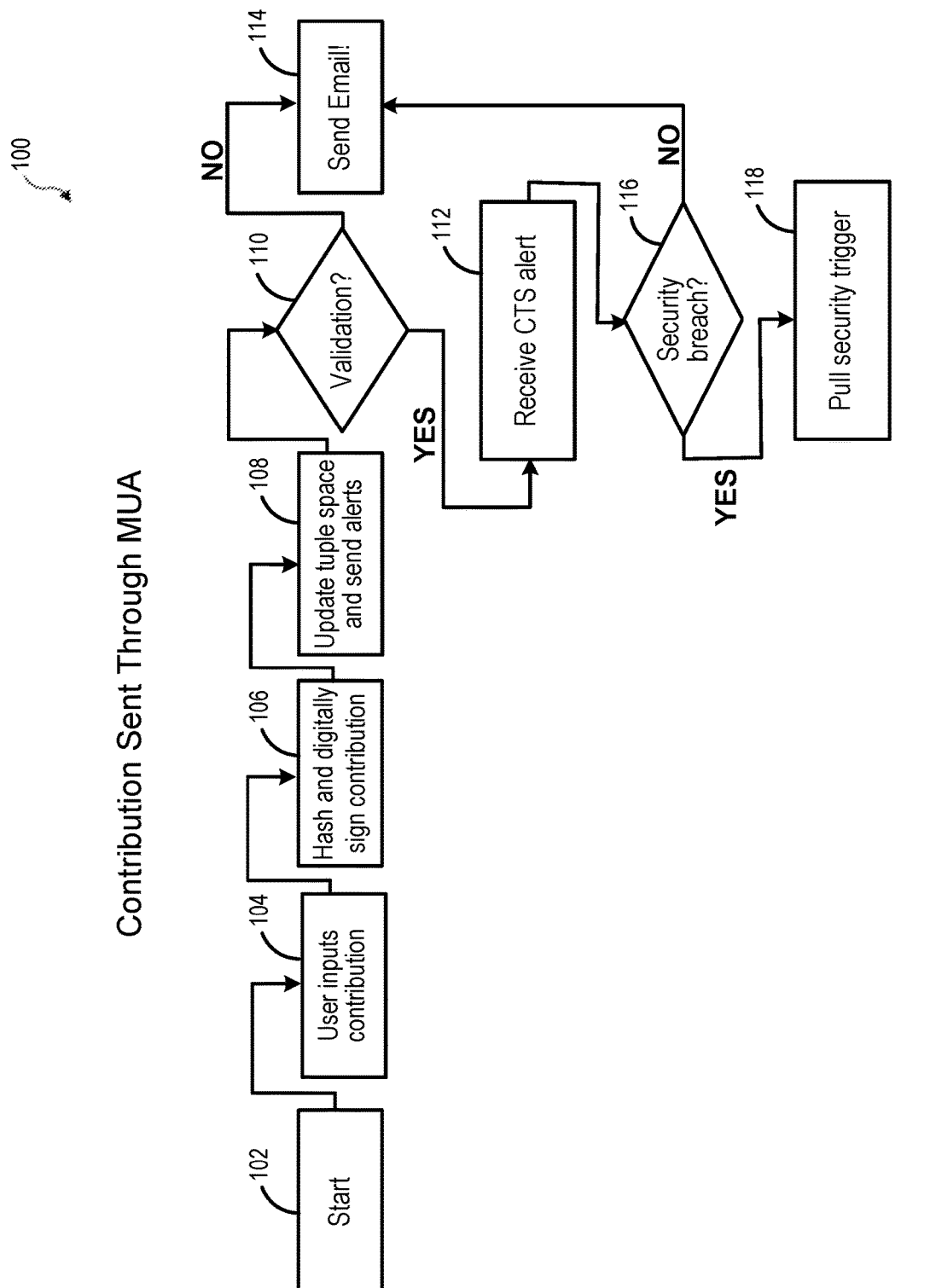
FIG. 3 shows an alternate method in accordance with aspects of this disclosure.

In FIG. 3 another exemplary computer method 100 of this disclosure is illustrated. The method starts at step 102. At step 104 a user inputs via a user device, such as user device 16 or 20, a new contribution (or new, or first, electronic communication) to an iterative electronic communication thread. The new contribution could be the first electronic communication or any new electronic communication to the iterative electronic communication thread. The MUA 18 or 22 at step 106 adds a hash and digital signature to the contribution, which are placed in a tuple space at step 108 and sent to the CTS 12 at step 110 for validation.

If the CTS 12 does not validate the information in the tuple space, at step 112 a CTS alert is sent to the MUA associated with the user device, such as user device 16 or 20, from which the contribution was created, and the contribution is not added to the electronic communication thread. As described above, a system administrator may also be notified. If the CTS 12 validates the contribution at step 114, the electronic communication, such as an email, is sent by the appropriate MUA.

At step 116, the CTS may identify a security breach and pull a security trigger, which can be any type of alert, at step 118.

Figure 4:
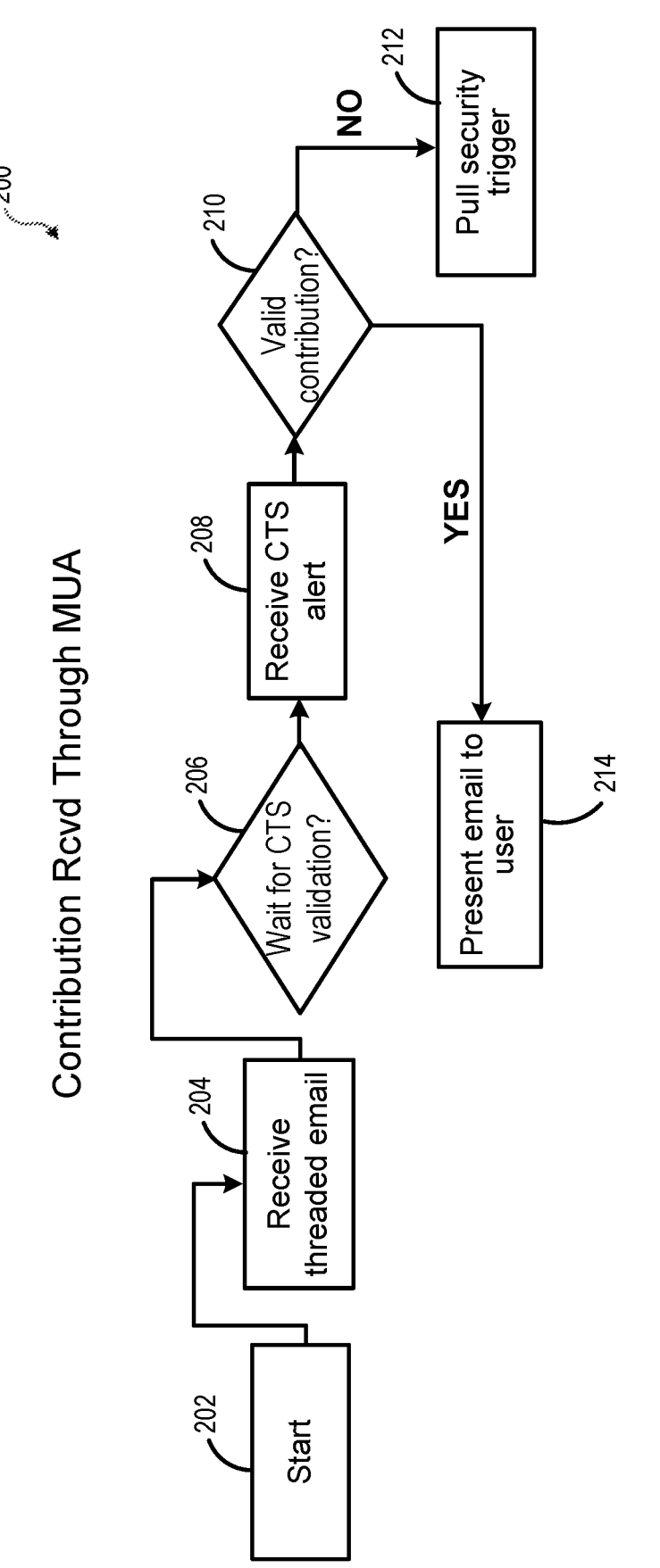
FIG. 4 shows an alternate computer method in accordance with aspects of this disclosure.

FIG. 4 shows another exemplary computer method 200. Method 200 starts at step 202 and at step 204 a user device, such as device 16 or 20, receives an electronic communication, such as an email thread. At step 206, the MUA associated with the user device that receives the iterative electronic communication thread, such as an email thread. The MUA forwards an alert and location in common memory 25 of a new contribution to an iterative electronic communication thread to a tuple space 11, 13, where the new contribution is accessible by CTS 12 for validation by checking its MUA cryptographic hash. At step 208, the CTS 12 alerts the MUA 18 or 22 through the tuple space 11 or 13. If the contribution to the electronic communication thread is valid, at step 210, the iterative electronic communication thread is presented to a user via user device 16 or 20 at step 214. If the contribution is determined by the CTS 12 to not be valid, a security trigger is pulled at step 212.

An Overall Workflow Example

A user makes a new contribution to an electronic communication (such as an email) thread through his/her user device, which is in communication with an MUA.

The MUA hashes the contribution using its private key, signs the contribution with a digital signature, and updates the tuple space with the cryptographic hash and an alert for the CTS.

The CTS validates the cryptographic hash, and possibly the digital signature and, if valid, updates the tuple space with the verification, which is accessible by the MUA.

If the new contribution is not valid, breach procedures are triggered by the CTS and/or MUA, and alerts are sent.

In some implementation, the CTS will alert the sending MUA that the contribution is valid as a form of permission for the MUA to send it.

In some implementations, if the contribution is valid, the CTS will alert the destination MUA(s) that a contribution they receive is valid to avoid the case in which an invalid contribution may be entered by bypassing the CTS function.

If the contribution is invalid, the CTS will trigger breach procedures. This can include setting an alert in the tuple space so that other system applications may take action. It could also include informing the sending and recipient MUAs so that it may take action and/or sending an alert to a system administrator that may include information regarding any invalid communication in the electronic communication thread.

Once an electronic communication, or an electronic communication thread, has been verified and transmitted, nothing need be saved in the tuple space(s) or the common memory. Further, if the CTS discovers a security breach, nothing need be stored after the appropriate security protocol is complete.

Possible Variations

In some implementations, an MUA could wait for permission from the CTS to send an email only after it has been validated. In other implementations, the MUA could automatically send an email after the user creates it, and its integrity is validated by a second MUA in communication with the CTS when received at a second user device.

While the system is primarily designed for email, the method and system herein could be used for secure chats, internal corporate communications, or even in secure data storage solutions that require validated change logs.

The description of embodiments provided herein is merely exemplary and is intended for purposes of illustration only; the following description is not intended to limit the scope of the claims. Moreover, recitation of multiple embodiments having stated features is not intended to exclude other embodiments having additional or fewer features or other embodiments incorporating different combinations of the stated features. The methods and systems according to this disclosure and claims can operate in a premise, cloud-based, or hybrid environment.

The features of the various embodiments may be stand alone or combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

What is claimed is:

1. An electronic communication system configured to certify an iterative electronic communication thread, wherein the system comprises:

a cryptographic trust server (CTS) configured to validate the iterative electronic communication thread;

a tuple server configured to generate tuple spaces that are in communication with the CTS;

a common memory in communication with the CTS, the common memory being configured to store electronic communications;

a first user device associated with a first user, wherein the first user device is configured to facilitate the creation of a first electronic communication by the first user; and a first messaging user agent (MUA) associated with and in communication with (a) the first user device, (b) a first tuple space generated by the tuple server, and (c) the common memory, wherein the first MUA is configured to (d) generate an MUA cryptographic hash for the first electronic communication utilizing a private key of the first MUA, (e) transmit the iterative electronic communication thread including the first electronic communication with the MUA cryptographic hash to the common memory, and (f) place in the first tuple space (i) an MUA alert indicating that the iterative electronic communication including the first electronic communication has been added to the common memory, and (ii) the location in the common memory where the first electronic communication is located;

wherein the CTS, in response to the MUA alert, is configured to access the common memory and either (a) verifies the authenticity of (i) a CTS hash that the CTS previously placed on the iterative electronic communication thread prior to the first electronic communication being added, and (ii) the MUA cryptographic hash for the first electronic communication, and (iii) places a new CTS hash on the iterative electronic communication thread including the first electronic communication, or (b) does not verify the authenticity of (i) the CTS hash that the CTS previously placed on the iterative electronic communication thread prior to the first electronic communication being added, or (ii) the MUA cryptographic hash for the first electronic communication, and (iii) does not place the new CTS hash on the iterative electronic communication thread including the first electronic communication; and if the authenticity of the iterative electronic communication thread including the first electronic communication is verified, the CTS is further configured to (a) place a first CTS alert in the tuple space to indicate same to the first MUA, or (b) place a second CTS alert in a second tuple space to indicate same to a second MUA.

2. The electronic communication system of claim 1, wherein the first MUA digitally signs the first electronic communication if it is verified by the CTS.

3. The electronic communication system of claim 1, wherein the MUA is further configured to transmit to the tuple space a thread identifier and the location in the common memory of each contribution to the iterative electronic communication thread, and the CTS either (a) verifies the authenticity of each contribution in the iterative electronic communication thread, places the CTS hash on the iterative electronic communication thread, and permits it to be received and opened by another user device, or (b) does not verify the authenticity of the iterative electronic communication thread, does not place the CTS hash on the iterative electronic communication thread, and does not permit it to be received and opened by another user device.

4. The electronic communication system of claim 1, wherein if the CTS places the first CTS alert in the tuple space, the first MUA receives the CTS hash and is configured to permit the iterative electronic communication thread including the first electronic communication to be (a) sent to, and (b) opened by another user device.

5. The electronic communication system of claim 1, wherein the iterative electronic communication thread including the first electronic communication is sent to a second user device in communication with the second MUA, the tuple server generates a second tuple space, the CTS places the second CTS alert in the second tuple space, and the second MUA receives the second CTS alert and permits the second user device to receive and open the iterative electronic communication thread including the first electronic communication.

6. The electronic communication system of claim 1, wherein the first MUA is further configured to place a digital signature on the first electronic communication if the MUA cryptographic hash is verified by the CTS.

7. The electronic communication system of claim 1 that further comprises a second client device configured to receive the iterative electronic communication thread including the first electronic communication, wherein the second client device is in communication with the second MUA, wherein the second MUA is configured to query the CTS before permitting the second client device to receive the iterative electronic communication thread including the first electronic communication by placing a second MUA alert in the second tuple space to cause the CTS to authenticate the MUA cryptographic hash and the CTS hash.

8. The electronic communication system of claim 7, wherein the second MUA is further configured to add a start marker and an end marker to the first electronic communication.

9. The electronic communication system of claim 1, wherein the iterative electronic communication thread is an email thread, and the system further includes an email server in communication with the first client device.

10. The electronic communication system of claim 1, wherein the first MUA is a plugin of the first client device.

11. A computer method of certifying electronic communications within an iterative electronic communication thread, wherein the method comprises the steps of:

using a first user device associated with a first user, creating a first electronic communication;

generating a first tuple space using a tuple server;

using a first MUA in communication with the first user device and in communication with the first tuple space, generating an MUA cryptographic hash for the first electronic communication using a private key of the first MUA, and placing the iterative electronic communication thread including the first electronic communication with the cryptographic hash into a common memory, and placing an alert in the first tuple space, wherein the alert notifies a CTS of the presence of the first electronic communication in the common memory; and in response to the alert, the CTS verifying the authenticity of (i) a CTS hash placed on the iterative electronic communication thread prior to the first electronic communication being added, and (ii) the MUA cryptographic hash for the first electronic communication, and (iii) placing a new CTS hash on the iterative electronic communication thread including the first electronic communication or not verifying (i) the CTS hash previously placed on the iterative electronic communication thread prior to the first electronic communication being added, or (ii) the MUA cryptographic hash for the first electronic communication, and (iii) not placing the new CTS hash on the iterative electronic communication thread including the first electronic communication.

12. The computer method of claim 11 that further comprises the step of the first MUA placing in the first tuple space the location of the first electronic communication in the common memory.

13. The computer method of certifying electronic communications within an iterative electronic communication thread of claim 12, wherein the CTS either (a) verifies the authenticity of the MUA cryptographic hash, places a CTS hash on the first electronic communication and permits the first electronic communication to be received and opened by another user device, or (b) does not verify the authenticity of the MUA cryptographic hash, does not place the CTS hash on the first electronic communication, and does not permit it to be received and opened by another user device.

14. The computer method of certifying electronic communications within an iterative electronic communication thread of claim 12 that further includes the steps of the CTS (a) verifying the authenticity of each contribution in the iterative electronic communication thread by reviewing a first CTS hash and the MUA cryptographic hash, and placing a second CTS hash on the iterative electronic communication thread including the first electronic communication, and permitting it to be received and opened by another user device, or (b) not verifying the authenticity of each contribution in the iterative electronic communication thread including the first electronic communication, not placing the second CTS hash on the iterative electronic communication thread including the first electronic communication, and not permitting it to be received and opened by another user device.

15. The computer method of certifying electronic communications within an iterative electronic communication thread of claim 12 that further includes the step of one or more of the first MUA and the CTS alerting one or more of the first user device, another MUA, another user device, and a system administrator if an electronic communication is not authenticated by the CTS.

16. The computer method of certifying electronic communications within an iterative electronic communication thread of claim 12 that further includes the step of the first MUA adding a thread identifier and a location within the common memory for each electronic communication within the iterative electronic communication thread into the first tuple space to assist the CTS in verifying the authenticity of each electronic communication within the iterative electronic communication thread.

17. The computer method of certifying electronic communications within an iterative electronic communication thread of claim 15 that further includes the step of storing in the common memory the first electronic communication thread MUA cryptographic hash.

18. A method of certifying iterative electronic communications in an iterative electronic communication thread that comprises the steps of:

a first MUA identifying a first electronic communication created by a first user device, wherein the first electronic communication is added to the iterative electronic communication thread;

the first MUA placing an MUA cryptographic hash on the first electronic communication and placing the iterative electronic communication thread including the first electronic communication into a common memory;

the first MUA placing an alert in a first tuple space generated by a tuple server, wherein the first tuple space is in communication with a CTS, wherein the CTS reviews the MUA cryptographic hash in the common memory;

the CTS either verifying or rejecting the first electronic communication based on the information in the MUA cryptographic hash and communicating the verification or rejection to the first MUA via the first tuple space; and the MUA transmitting the iterative electronic communication thread including the first electronic communication if the first electronic communication is verified by the CTS and blocking transmission if the first electronic communication is rejected by the CTS.

19. The computer method of certifying iterative electronic communications in an iterative electronic communication thread of claim 18 that further comprises the steps of:

receiving, on a second user device in communication with a second MUA, the iterative electronic communication thread including the first electronic communication;

the second MUA transmitting the iterative electronic communication thread including the first electronic communication to the common memory, and placing a second alert in a second tuple space generated by the tuple server, wherein the second alert notifies the CTS to review the MUA cryptographic hash of the first electronic communication; and the CTS examining and (a) verifying the authenticity of the MUA cryptographic hash and permitting the first electronic communication to be opened by the second user device, or (b) not verifying the authenticity of the MUA cryptographic hash, and not permitting the first electronic communication to be opened by the second user device.

20. The computer method of certifying iterative electronic communications in an iterative electronic communication thread of claim 18 that further includes the steps of the CTS (a) verifying the authenticity of each contribution to the iterative electronic communication thread including the first electronic communication, placing a CTS hash on the iterative electronic communication thread including the first electronic communication, and permitting the iterative electronic communication thread including the first electronic communication, to be received and opened by another user device, or (b) not verifying the authenticity of the iterative electronic communication thread including the first electronic communication, not placing the CTS hash on the iterative electronic communication thread including the first electronic communication, and not permitting the iterative electronic communication thread including the first electronic communication, to be received and opened by another user device.

* * * * *